No. 787,952. PATENTED APR. 25, 1905.
H. C. SLATER.
LAWN ROLLER AND MOWER.
APPLICATION FILED NOV. 15, 1902.

3 SHEETS—SHEET 1.

Witnesses
Inventor
H. C. Slater
Attorneys

No. 787,952. PATENTED APR. 25, 1905.
H. C. SLATER.
LAWN ROLLER AND MOWER.
APPLICATION FILED NOV. 15, 1902.

3 SHEETS—SHEET 3.

Witnesses
Inventor
H. C. Slater
Attorneys

No. 787,952.                                              Patented April 25, 1905.

UNITED STATES PATENT OFFICE.

HOWARD C. SLATER, OF RIDLEY PARK, PENNSYLVANIA, ASSIGNOR TO WILLIAM P. SIMPSON, OF OVERBROOK, PENNSYLVANIA.

LAWN ROLLER AND MOWER.

SPECIFICATION forming part of Letters Patent No. 787,952, dated April 25, 1905.

Application filed November 15, 1902. Serial No. 131,563.

*To all whom it may concern:*

Be it known that I, HOWARD C. SLATER, a citizen of the United States, residing at Ridley Park, in the county of Delaware and State of Pennsylvania, have invented certain new and useful Improvements in Lawn Rollers and Mowers, of which the following is a specification.

My invention relates to lawn rollers and cutters, and especially to that class of rollers or cutters driven by motive power; and my invention consists in means for connecting the main and swiveling frames and in means for supporting the cutter-frame to maintain the bearings of the latter from contact with the ground during normal cutting operations while properly regulating the height of the cut as fully as set forth hereinafter, and as illustrated in the accompanying drawings, in which—

Figure 1:
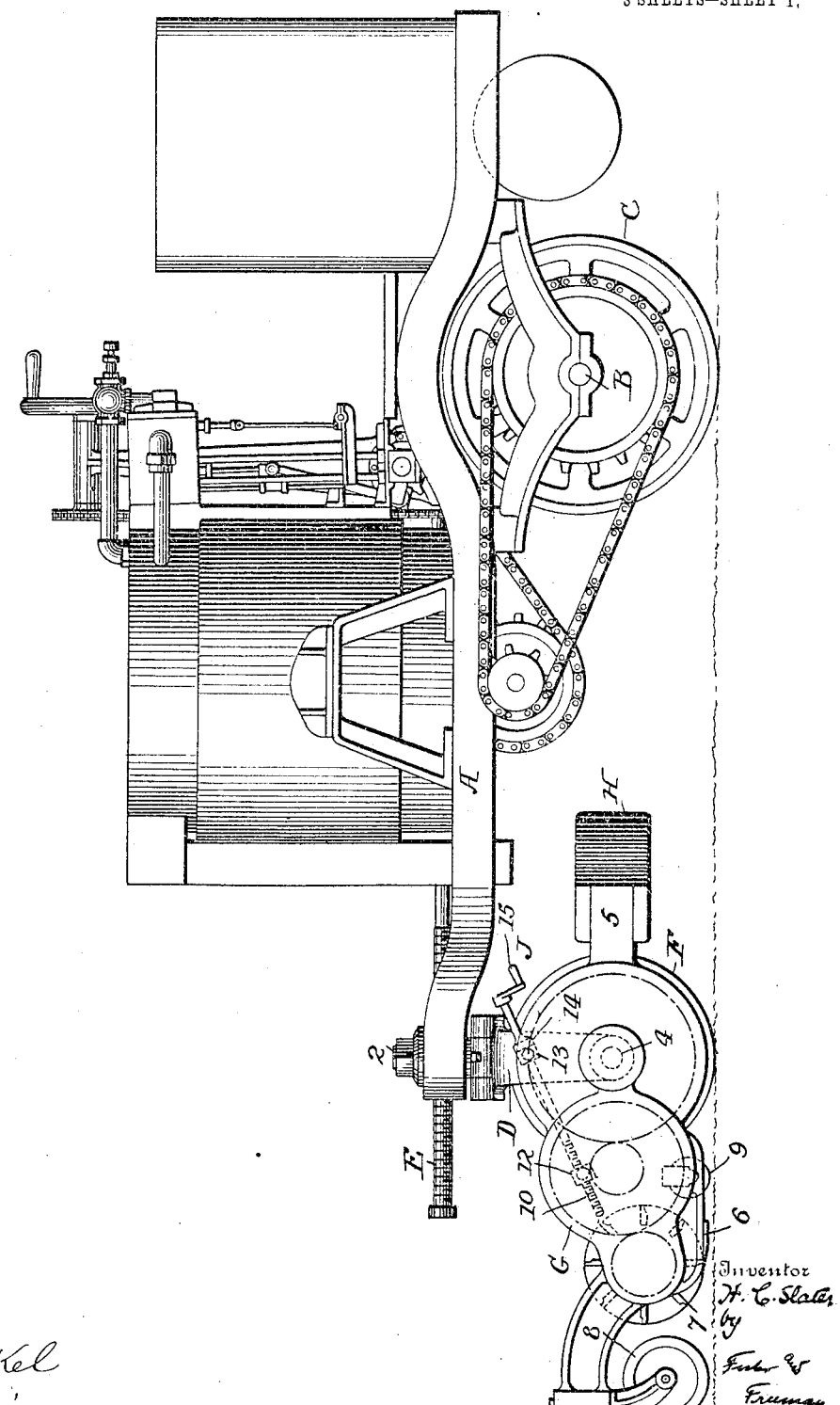
Figure 2:
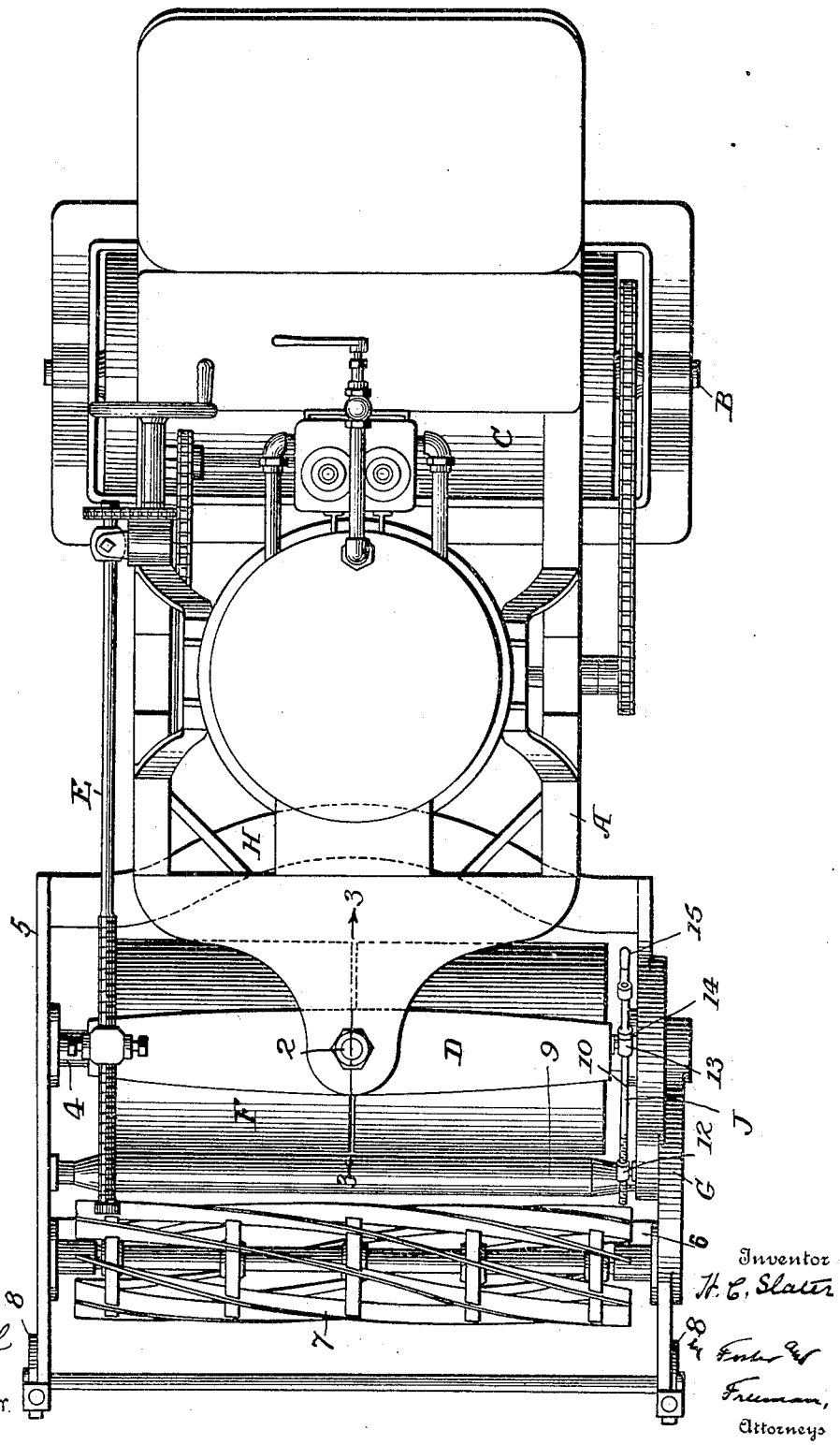
Figure 3:
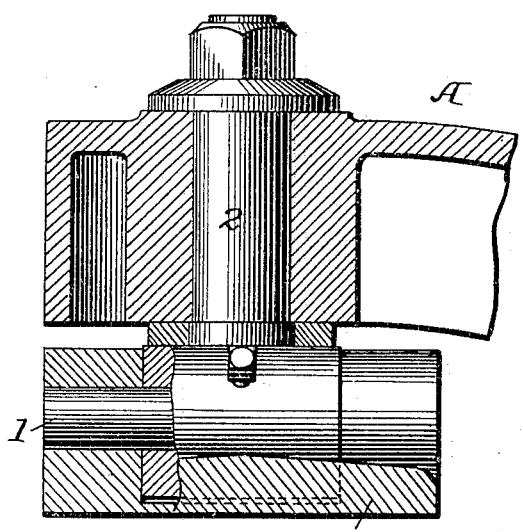
Figure 4:
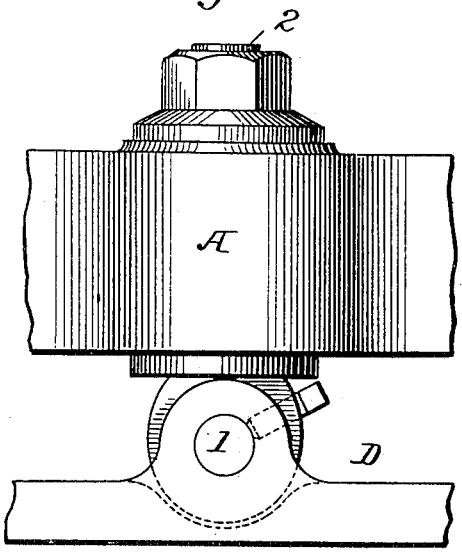
Figure 5:
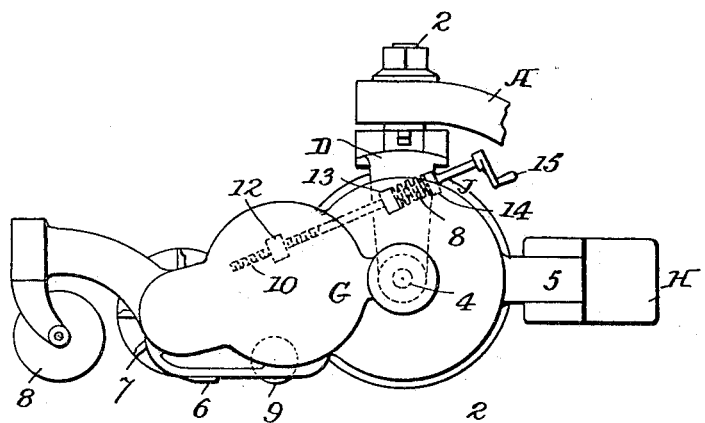
Figure 6:
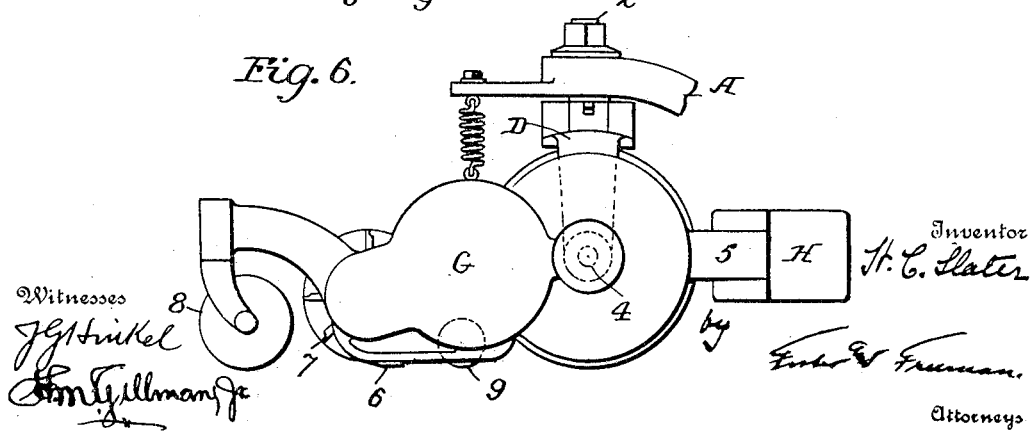

Figure 1 is a side view of a lawn roller and mower embodying my invention; Fig. 2, a plan; Fig. 3, an enlarged section on the line 3 3, Fig. 2; Fig. 4, a front view of Fig. 3; Figs. 5 and 6, views illustrating modifications.

The engine, generator, and burner or other source of motor-power are supported upon a main frame A, having its bearing at one end upon the axle B of the traction roller or rollers C, (the same sometimes being made in two sections,) and the forward end of the main frame is supported by a rolling roller, which preferably is supported in a swiveling frame D, pivoted by a longitudinal bolt 1 to the lower end of a vertical bolt 2, which turns in a socket in the main frame. This permits either frame A or D to rock laterally independently of the other, while the frame D, which constitutes the steering-frame, may be turned to properly direct the course of the machine by means of a screw-rod E or by any other suitable means.

The shaft 4 of the lawn roller or rollers F (the same being in one or more sections) is supported on the frame D, and said roller also supports the cutter-frame G, which may swing on the shaft 4 or on pivots of the roller-frame. Upon the frame G are supported the cutting devices, consisting, as shown, of the fixed cutter-blade 6 and rotating cutter 7, the latter being driven by suitable devices, as gears, from the rotating roller F. The mower-frame is preferably provided at the front with ground-engaging bearings, shown as swiveled bearing-rolls 8, and at the rear of the knife 6 is a transverse roll 9. Normally the cutter-frame is out of contact with the ground and is maintained in this position wherever the surface of the ground is level by means of an adjusting device J, shown as consisting of a screw-rod 10, passing through a swiveled nut 12 at the side of the frame G and through a swiveled bearing-block 13 on the frame D, a shoulder 14 of the rod bearing against the block 13, the rod being provided with a handle 15, by which it may be turned to lift the rollers of the mower-frame free of the ground. The frame A constitutes a platform which supports the operator. If the mower-frame is brought onto an uneven surface, its bearing-rolls 8 by contact therewith will lift the forward part of the mower-frame, the rod 10 sliding in the bearing 13, while the roller 9, in case the machine is moved backward, will have the same effect. In order to reduce the jars from changes of position, a spring 18 may be interposed between the nut 14 and bearing 13, as shown in Fig. 5, said spring being of a strength to practically counterweight the cutter-frame, or this spring may be interposed between the frame D and the cutter-frame, as shown in Fig. 6. Preferably, however, the cutter-frame is counterbalanced by an adjustable block or weight H, secured to arms 5 of the cutter-frame, the weight of the block, added to that of the cutter-frame, serving to add to the efficiency of the roller F. As the cutter-frame is almost wholly counterbalanced, there is but little strain on the adjusting devices, and it will readily swing upward if the bearing-rolls 8 are brought temporarily upon the ground.

It will be seen that while the mower-frame is normally out of engagement with the ground it is held in position adjusted to cut the grass at the desired height and that if the ground should be irregular the cutters are prevented from coming into engagement with the ground or from cutting the grass too short.

Although I have shown the roller-frame pivoted to the main frame, it will be evident that, as in other lawn rollers and mowers, the roller-frame may be part of the main frame, other guiding means being employed, or the traction-rollers may also be used for rolling.

The main frame supports the motor M of suitable character and a liquid-fuel tank S.

Without limiting myself to the precise construction and arrangement of parts shown, I claim as my invention—

1. The combination with the roller-frame having a platform for the operator, of a front roller, its axle, a cutter-frame, and means whereby substantially its entire weight is carried on the said axle, a frame D also supported on said axle and connected by a universal-jointed connection with the roller-frame, and means adjacent to the operator's position on the platform for swinging horizontally the said frame D, substantially as set forth.

2. The combination with the roller-frame having a platform for the operator, of a front roller, its axle, a cutter-frame, and means whereby substantially its entire weight may be carried on the said axle, a frame D also supported on said axle and connected by a universal-jointed connection with the roller-frame, and means supported by the frame D for limiting the movement of the cutter-frame toward the ground, substantially as set forth.

3. The combination in a lawn roller and mower, of a main frame, a pivoted front frame D, an adjustable counterbalanced cutter-frame, and means supported by the frame D for normally and positively limiting the downward movement of the cutter-frame toward the ground to secure the desired height of cut without limiting the free upward movement of such frame, substantially as set forth.

In testimony whereof I have signed my name to this specification in the presence of two subscribing witnesses.

HOWARD C. SLATER.

Witnesses:
J. De Haven Ledward,
Jos. H. Hinkson.